US012651797B2

(12) United States Patent
Janarthanam et al.

(10) Patent No.: US 12,651,797 B2
(45) Date of Patent: Jun. 9, 2026

(54) TRACTION BATTERY ASSEMBLY HAVING A SEPARATOR SHEET

(71) Applicant: Ford Global Technologies, LLC, Dearborn, MI (US)

(72) Inventors: Suriyaprakash Ayyangar Janarthanam, Canton, MI (US); Bhaskara Rao Boddakayala, Troy, MI (US); Neil Robert Burrows, Milford, MI (US); Kanchana Perumalla, Troy, MI (US); David Fabricatore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 635 days.

(21) Appl. No.: 17/544,035

(22) Filed: Dec. 7, 2021

(65) Prior Publication Data

US 2023/0178837 A1    Jun. 8, 2023

(51) Int. Cl.
| | |
|---|---|
| *H01M 10/625* | (2014.01) |
| *B60L 50/64* | (2019.01) |
| *H01M 10/613* | (2014.01) |
| *H01M 10/6554* | (2014.01) |
| *H01M 50/289* | (2021.01) |
| *H01M 50/293* | (2021.01) |

(52) U.S. Cl.
CPC ........... *H01M 50/289* (2021.01); *B60L 50/64* (2019.02); *H01M 10/613* (2015.04); *H01M 10/625* (2015.04); *H01M 10/6554* (2015.04); *H01M 50/293* (2021.01); *H01M 2220/20* (2013.01)

(58) Field of Classification Search
CPC ............. H01M 50/289; H01M 10/613; H01M 10/625; H01M 10/6554; H01M 50/293; H01M 2220/20; H01M 10/6557; H01M 10/647; H01M 10/653; H01M 10/6555; H01M 10/6556; H01M 50/209; H01M 10/04; H01M 10/42; H01M 10/615; H01M 10/655; B60L 50/64; B60L 58/26; Y02E 60/10
See application file for complete search history.

(56) References Cited

U.S. PATENT DOCUMENTS

| | | | |
|---|---|---|---|
| 10,668,832 B2 | 6/2020 | Capati et al. | |
| 10,991,998 B2 | 4/2021 | Dawley et al. | |
| 11,038,223 B2 | 6/2021 | Cho et al. | |
| 2009/0317641 A1* | 12/2009 | Supriya .................... | F28F 7/00 |
| | | | 156/60 |
| 2016/0322679 A1* | 11/2016 | Landerer ............. | H01M 10/613 |
| 2020/0243928 A1* | 7/2020 | Schmidt .............. | H01M 10/655 |
| 2021/0254910 A1* | 8/2021 | Lee ...................... | H01L 23/3675 |
| 2022/0347990 A1* | 11/2022 | Howe .................... | B32B 27/16 |

FOREIGN PATENT DOCUMENTS

| | | |
|---|---|---|
| WO | 2020174804 | 9/2020 |

* cited by examiner

*Primary Examiner* — Muhammad S Siddiquee
(74) *Attorney, Agent, or Firm* — David B. Kelley; Carlson, Gaskey & Olds, P.C.

(57) ABSTRACT

A traction battery assembly, includes, among other things, a thermal exchange plate, a battery array, a thermal interface material between the thermal exchange plate and the battery array, and a separator sheet between the thermal exchange plate and the battery array. The separator sheet is in in direct contact with the thermal interface material.

19 Claims, 4 Drawing Sheets

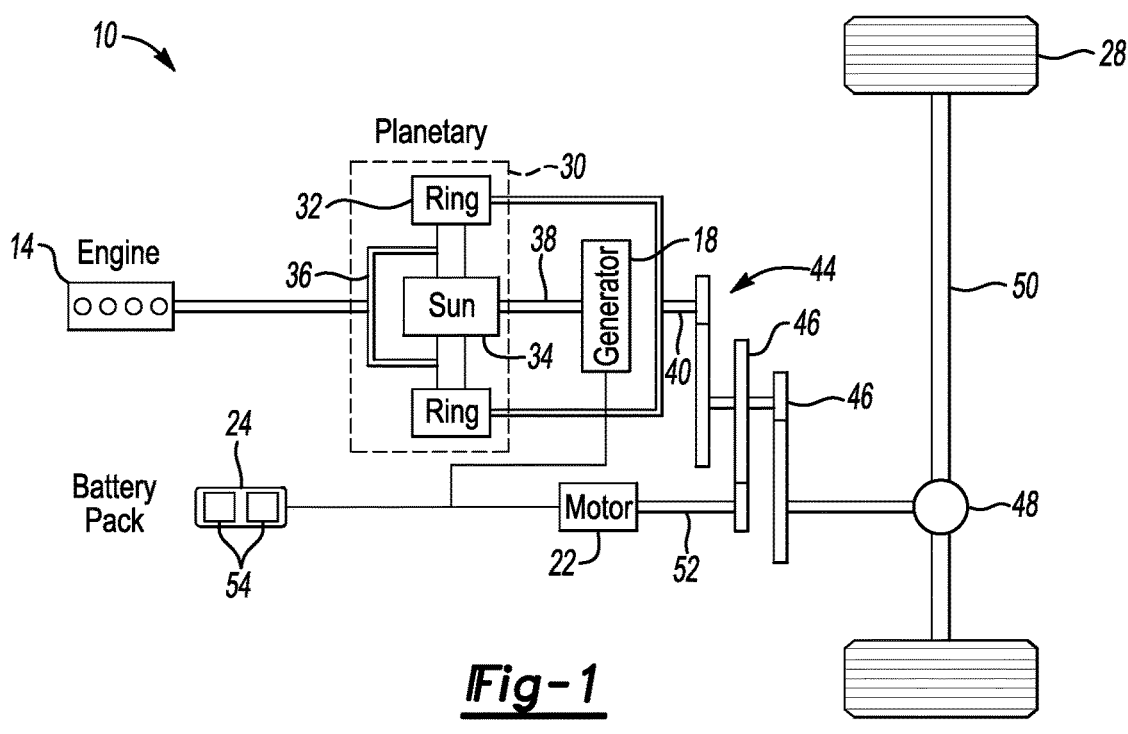
_Fig-1_
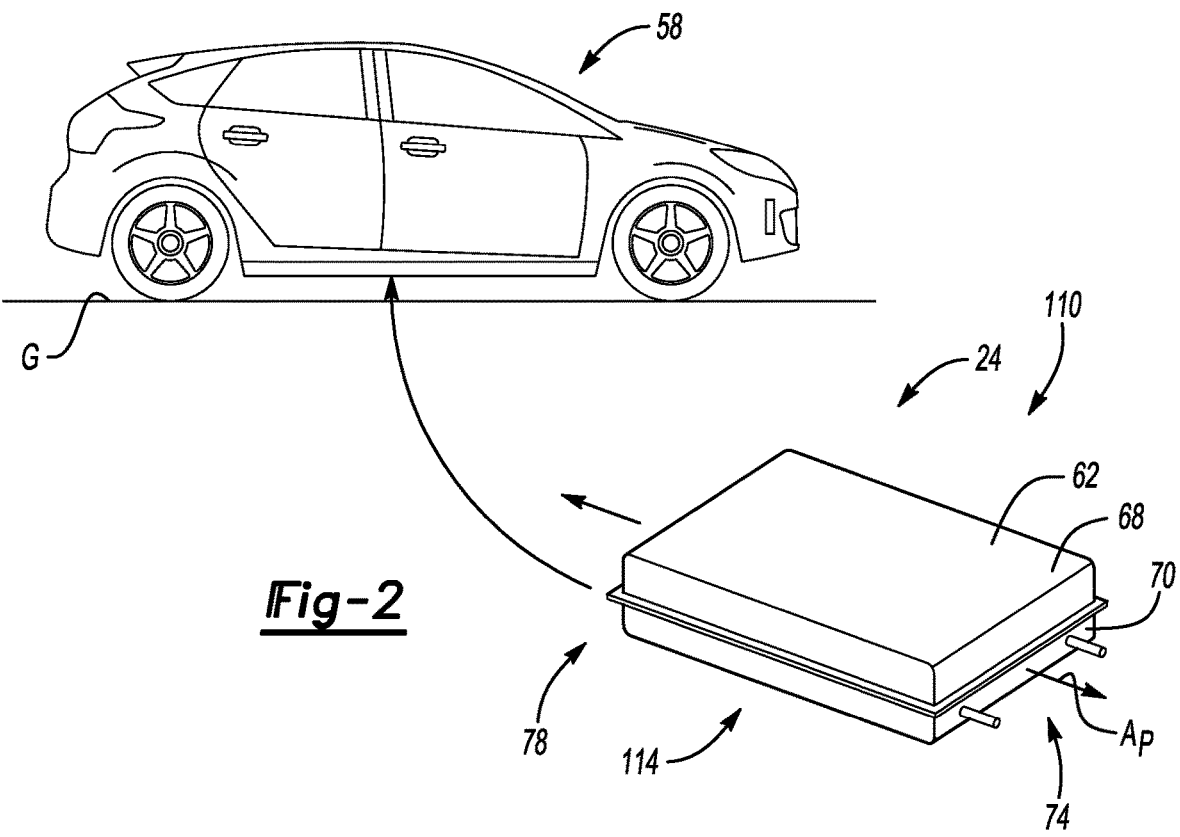
_Fig-2_

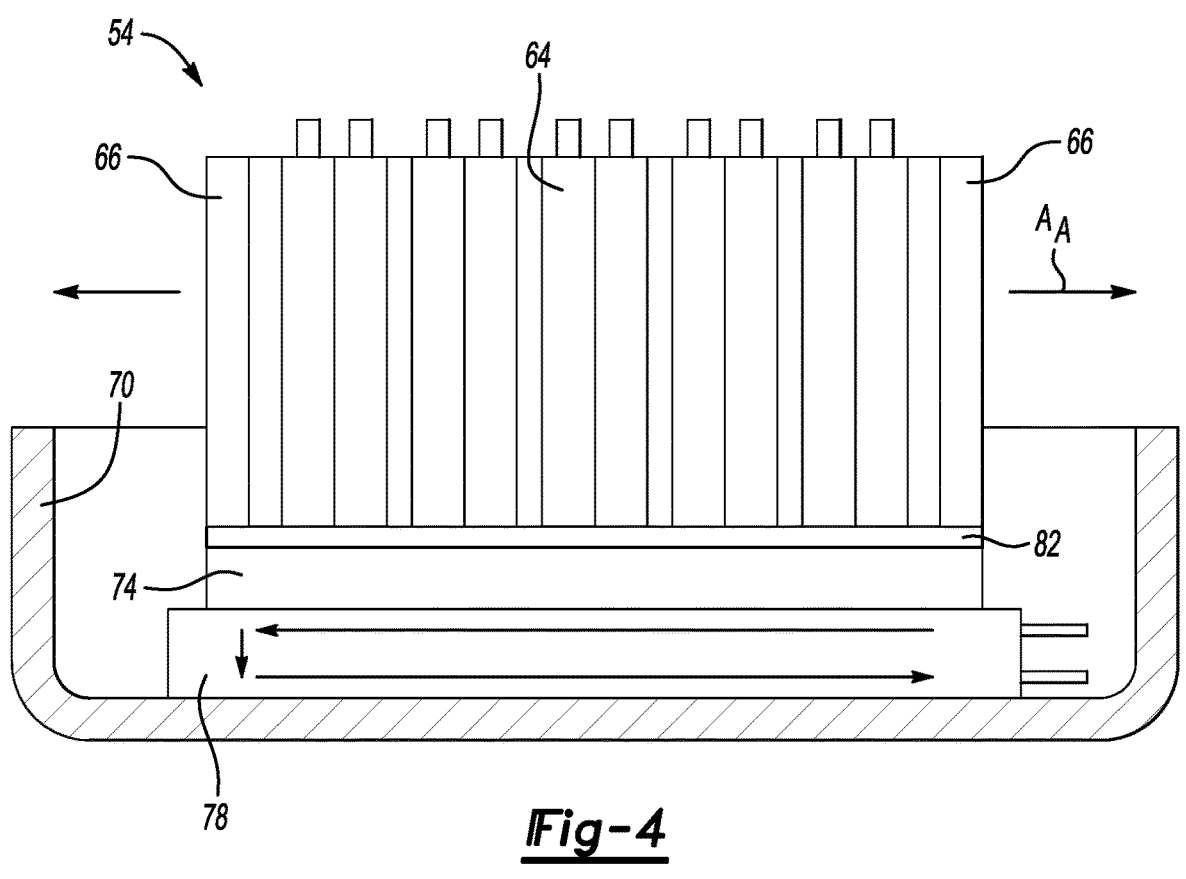
_Fig-4_
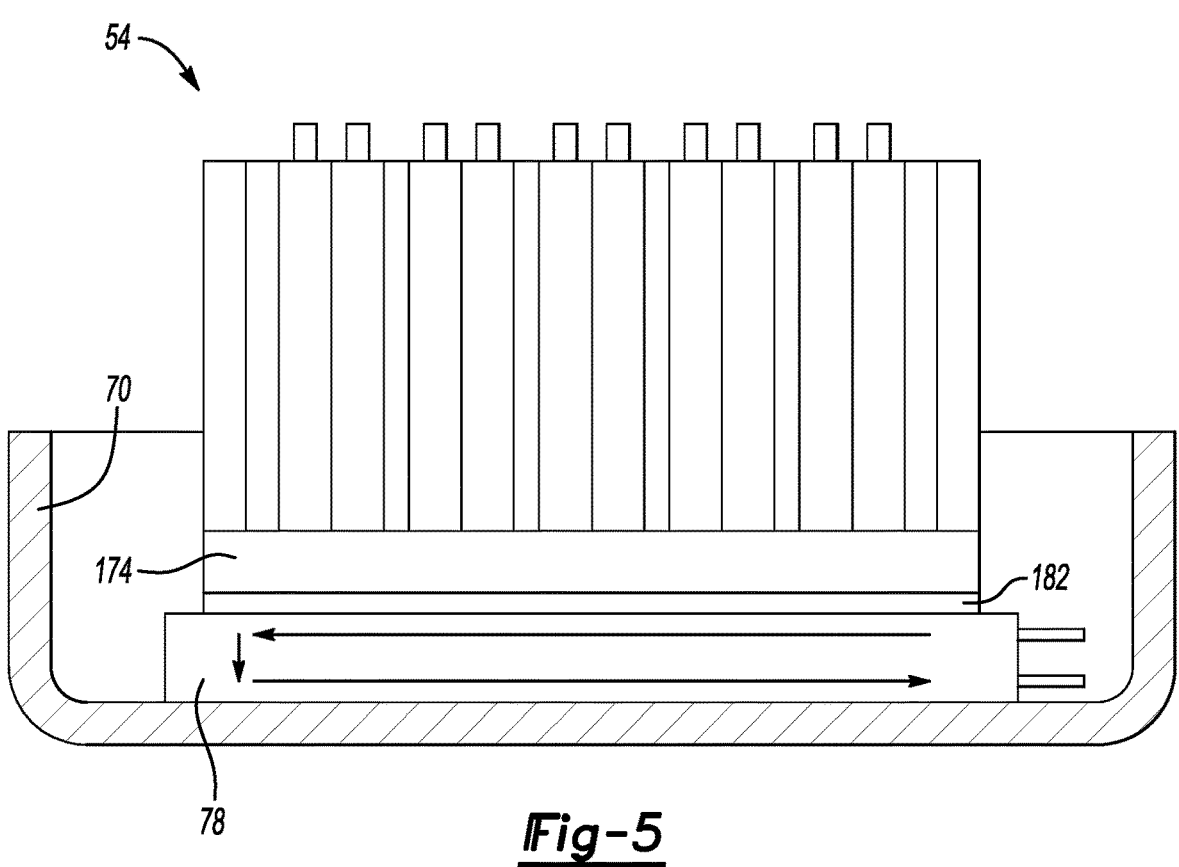
_Fig-5_

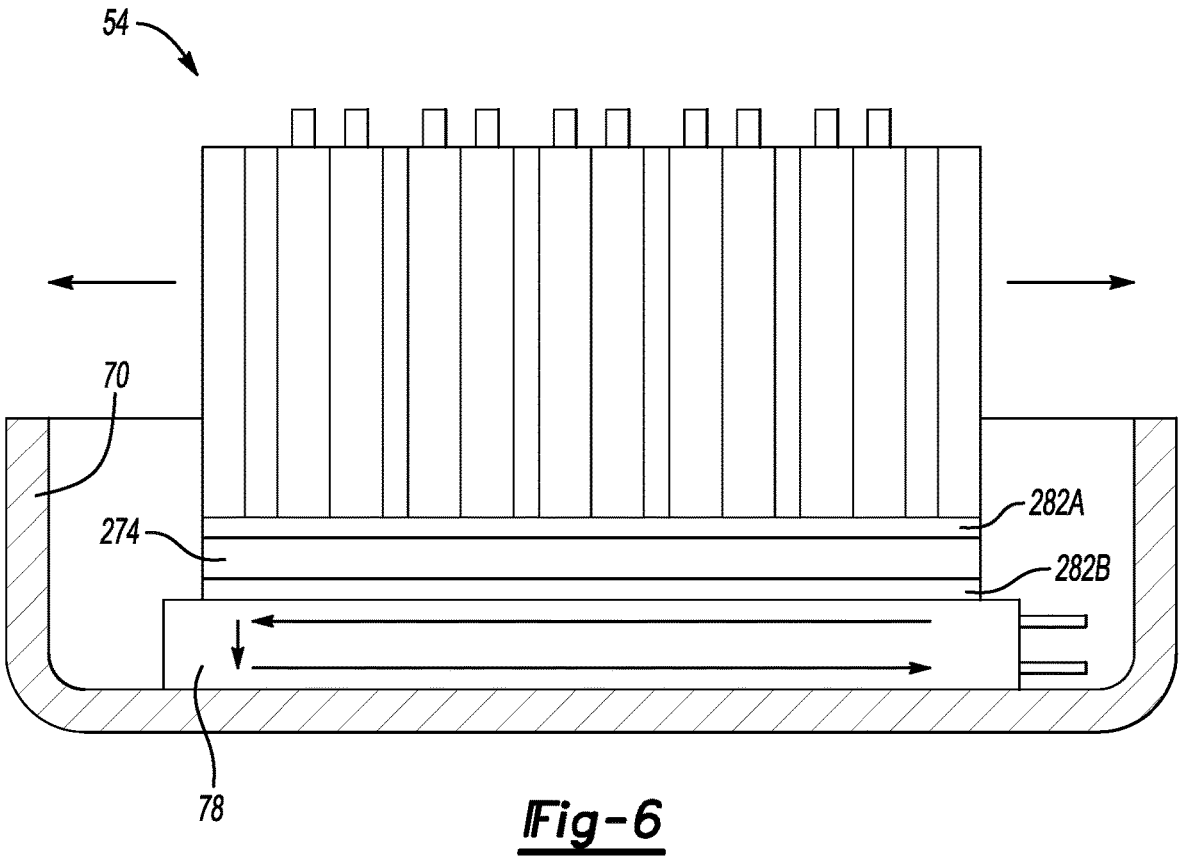
_Fig-6_

TRACTION BATTERY ASSEMBLY HAVING A SEPARATOR SHEET

TECHNICAL FIELD

This disclosure relates generally to servicing a traction battery and, more particularly, separating a battery array from a thermal exchange plate during the servicing.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

In some aspects, the techniques described herein relate to a traction battery assembly, including: a thermal exchange plate; a battery array; a thermal interface material between the thermal exchange plate and the battery array; and a separator sheet between the thermal exchange plate and the battery array, the separator sheet in direct contact with the thermal interface material.

In some aspects, the techniques described herein relate to a traction battery assembly, wherein the thermal interface material is in direct contact with the thermal exchange plate, wherein the separator sheet is sandwiched between the thermal interface material and the battery array.

In some aspects, the techniques described herein relate to a traction battery assembly, wherein the separator sheet is vertically below the battery array, wherein the separator sheet is vertically above the thermal interface material and the thermal exchange plate.

In some aspects, the techniques described herein relate to a traction battery assembly, wherein a first side of the thermal interface material is adhered to the separator sheet and an opposite, second side of the thermal interface material is adhered to the thermal exchange plate.

In some aspects, the techniques described herein relate to a traction battery assembly, wherein the thermal interface material is in direct contact with the battery array, wherein the separator sheet is sandwiched between the thermal interface material and the thermal exchange plate.

In some aspects, the techniques described herein relate to a traction battery assembly, wherein the separator sheet is vertically below the battery array and the thermal interface material, wherein the separator sheet is vertically above the thermal exchange plate.

In some aspects, the techniques described herein relate to a traction battery assembly, wherein a first side of the thermal interface material is adhered to the battery array and an opposite, second side of the thermal interface material is adhered to the separator sheet.

In some aspects, the techniques described herein relate to a traction battery assembly, wherein the separator sheet is a polymer-based film.

In some aspects, the techniques described herein relate to a traction battery assembly, wherein the separator sheet is a polyethylene terephthalate sheet.

In some aspects, the techniques described herein relate to a traction battery assembly, wherein the thermal interface material is a liquid thermal interface material.

In some aspects, the techniques described herein relate to a traction battery assembly, wherein the thermal interface material is a thermal interface material pad.

In some aspects, the techniques described herein relate to a traction battery assembly, about an entire circumferential perimeter of the thermal interface material, a peripheral area of the separator sheet extends past a periphery of the thermal interface material.

In some aspects, the techniques described herein relate to a traction battery assembly, wherein the separator sheet is a first separator sheet that is sandwiched between the battery array and the thermal interface material, and further including a second separator sheet that is sandwiched between the thermal interface material and the thermal exchange plate.

In some aspects, the techniques described herein relate to a method of assembling a traction battery assembly, including: using a separator sheet to prevent a thermal interface material from bonding directly to a battery array or a thermal exchange plate.

In some aspects, the techniques described herein relate to a method, wherein the thermal interface material is bonded to the thermal exchange plate, and using the separator sheet to prevent the thermal interface material from bonding to the battery array.

In some aspects, the techniques described herein relate to a method, wherein the thermal interface material is bonded to the battery array, and further including using the separator sheet to prevent the thermal interface material from bonding to the thermal exchange plate.

In some aspects, the techniques described herein relate to a method, wherein the separator sheet is a first separator sheet that is sandwiched between the battery array and the thermal interface material, and further including using a second separator sheet that is sandwiched between the thermal interface material and the thermal exchange plate to prevent the thermal interface material from bonding directly to the thermal exchange plate.

In some aspects, the techniques described herein relate to a method, further including moving the battery array relatively away from the thermal exchange plate and the thermal interface material while the thermal interface material remains bonded to the thermal exchange plate.

In some aspects, the techniques described herein relate to a method, further including moving the battery array and the thermal interface material relatively away from the thermal exchange plate while the thermal interface material remains bonded to the battery array.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 illustrates a highly schematic view of a powertrain for an electrified vehicle.

FIG. 2 illustrates how a battery pack of the powertrain of FIG. 1 can be positioned within the electrified vehicle according to an exemplary aspect of the present disclosure.

FIG. 4 illustrates a side view of the battery pack of FIG. 3.

FIG. 5 illustrates a side view of a battery pack according to another exemplary embodiment of the present disclosure.

FIG. 6 illustrates a side view of a battery pack according to yet another exemplary embodiment of the present disclosure.

DETAILED DESCRIPTION

Figure 3:
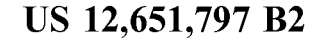
FIG. 3 illustrates an expanded view of the battery pack of FIG. 2 according to an exemplary aspect of the present disclosure.

In current designs, a thermal interface material (TIM) can be sandwiched between a battery array and a thermal exchange plate. The TIM bonds to both the battery array and the thermal exchange plate. Separating the battery array from the thermal exchange plate during service can required severing one of these bonds, which can potentially damage the thermal exchange plate by, among other things, bending the thermal exchange plate.

This disclosure details assemblies and methods that facilitate servicing a battery pack. In particular, a separator sheet is used to prevent TIM from bonding to one of a battery array or a thermal exchange plate. This facilitates service and the battery array can be separate from the thermal exchange plate without severing a bond between the TIM and the thermal exchange plate or the battery array.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. The battery pack 24 is a traction battery pack as the battery pack 24 can provides power to propel the vehicle drive wheels 28. The battery pack 24 includes a plurality of battery arrays 54.

With reference to FIG. 2-4, the battery pack 24 can be secured to an electrified vehicle 58 and, in particular, to an underside of the electrified vehicle 58. The battery pack 24, in this example, includes two battery arrays 54 held within an interior area provided by an enclosure 62. In other examples, the battery pack 24 could include more than two battery arrays, or a single battery array, within the enclosure 62.

Each of the battery arrays 54 can include a plurality of individual battery cells 64. The battery cells 64 for each of the battery arrays 54 are distributed along a respective array axis AA. The battery cells 64 of each of the battery arrays 54 are held between endplates 66. The example battery pack 24 includes a single tier of battery arrays 54. Other example battery packs that could utilize the teaches of this disclosure include multi-tier battery packs.

The example enclosure 62 includes a cover 68 and a tray 70. The cover 68 and tray 70 can be polymer-based. Alternatively, the cover 68, the tray 70, or both can be a metal or metal alloy.

The battery pack 24 includes thermal interface material (TIM) 74 and a thermal exchange plate 78 within the interior of the enclosure 62. In this example, the TIM 74 is disposed on the thermal exchange plate 78 beneath each of the battery arrays 54. The TIM 74 can be soft TIM pads or a liquid TIM, for example. The TIM 74 can conform to geometric irregularities in the bottom of the battery arrays 54. This can help to avoid air gaps between the battery arrays 54 and the thermal exchange plate 78.

In this example, the battery arrays 54 generate thermal energy during operation. The TIM 74 helps to pass thermal energy from the battery arrays 54 to the thermal exchange plate 78. This cools the battery arrays 54 and other areas of the battery pack 24. Coolant can be moved through the thermal exchange plate 78 to take on the thermal energy from the thermal exchange plate 78. The coolant can then be circulated from the thermal exchange plate 78 to a radiator that is outside of the battery pack 24. At the radiator, thermal energy can pass from the coolant to air. The coolant can then be recirculated back to the battery pack 24. In other examples, coolant can be circulated though the thermal exchange plate 78 to heat, rather than cool, the battery arrays 54.

The exemplary embodiment includes a separator sheet 82 between the TIM 74 and the battery arrays 54. The TIM 74 is bonded directly to the thermal exchange plate 78. The separator sheet 82 prevents the TIM 74 from bonding directly to the battery arrays 54. The battery arrays 54, the TIM 74, the thermal exchange plate 78, and the separator sheet 82 together provide a traction battery assembly.

The separator sheet 82 can be a cut sheet that is situated on the thermal exchange plate 78 after the TIM 74 is deposited on the thermal exchange plate 78. The TIM 74 can bond to the separator sheet 82.

The battery arrays 54 are then disposed vertically atop the separator sheet 82. Vertical, for purposes of this disclosure, is with reference to ground in an ordinary orientation of the vehicle during operation. Notably, each separator sheet 82 extends laterally at least to a periphery of the battery array 54 to inhibit any bonding between the battery array 54 and the TIM 74.

In this example, the separator sheet 82 is larger than the TIM 74. That is, about an entire circumferential perimeter of the TIM 74 beneath one of the battery arrays 54, a peripheral area of the separator sheet 82 extends past a periphery of the TIM 74.

Due to the separator sheets 82, the battery arrays 54 can be moved away from the thermal exchange plate 78 without needing to sever a bond between the battery arrays 54 and the TIM 74.

The separator sheet 82 provides a separation barrier between the battery arrays 54 and the TIM 74. The battery arrays 54 can, for example, be removed from the battery pack 24 for service without damaging the thermal exchange plate 78 or surrounding structures. The TIM 74 can then be reused with a replacement battery array.

The separator sheet 82, in this example, is a polymer film sheet. The separator sheet 82 can be, for example, polyethylene terephthalate (PET) film, which has a relatively high tensile strength, dimensional stability, low moisture absorption. PET films can retain such physical properties over a wide range of temperature environments. In some examples, the battery cells 64 are prismatic cells that are also wrapped with a PET film.

The separator sheet 82 is a thermally conductive sheet. The separator sheet 82 can include conductive particles, such as ceramic particles, to facilitate thermal conductivity. In an example, a thermal conductivity of the separator sheet 82 is greater than or equal to 0.6 watts per meter-kelvin.

In the exemplary embodiment of FIGS. 3 and 4, the TIM 74 is in direct contact with the thermal exchange plate 78, and the separator sheets 82 are then sandwiched between the TIM 74 and the battery arrays 54. The separator sheets 82 are vertically below the battery arrays 54. The separator sheets 82 are vertically above the TIM 74 and the thermal exchange plate 78. An upper, first side of the TIM 74 is adhered or bonded directly to the separator sheet 82. A lower, second side of the TIM 74 is adhered or bonded to the thermal exchange plate 78.

With reference now to FIG. 5, in another exemplary embodiment, TIM 174 is in direct contact with the battery array 54 and can be bonded directly to the battery array 54. A separator sheet 182 is sandwiched between the TIM 174 and the thermal exchange plate 78. Thus, when the battery arrays 54 are moved away from the thermal exchange plate 78, the TIM 174 moves with the battery arrays 54. In this embodiment, the separator sheet 182 is vertically below the battery array 54 and the TIM 174. The separator sheet 182 is then vertically above the thermal exchange plate 78. Further, a first, upper side of the TIM 174 is adhered or bonded directly to the battery array 54. A second, lower side of the TIM 174 is adhered or bonded directly to the separator sheet 182.

FIG. 6 shows yet another exemplary embodiment where a first separator sheet 282A and a second separator sheet 282B are disposed beneath the battery array 54 on opposite sides of TIM 274. The first separator sheet 282A blocks the TIM 274 from bonding to the battery array 54. The first separator sheet 282A is sandwiched between the battery array 54 and the TIM 274. The second separator sheet 282B is sandwiched between the TIM 274 and the thermal exchange plate 78. The second separator sheet 282B prevents the TIM 274 from bonding directly to the thermal exchange plate.

Preventing TIM from bonding directly to both a battery array and a thermal exchange plate can, among other things, facilitate servicing of a battery pack by preventing damage to a battery array, a thermal exchange plate, or both. In some embodiments, the battery array and thermal exchange plate can be moved away from one another while the TIM remains bonded to the battery array but not the thermal exchange plate. In other embodiments, the battery array and the thermal exchange plate can be moved away from one another while the TIM remains bonded to the thermal exchange plate but not the battery array. In still other embodiments, the battery array and the thermal exchange plate can be moved away from one another without the TIM bonding to the thermal exchange plate or the battery array.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
   a thermal exchange plate;
   a battery array;
   a thermal interface material between the thermal exchange plate and the battery array; and
   a separator sheet between the thermal exchange plate and the battery array, the separator sheet in direct contact with the thermal interface material, wherein, about an entire circumferential perimeter of the thermal interface material, a peripheral area of the separator sheet extends past a periphery of the thermal interface material.

2. The traction battery assembly of claim 1, wherein the thermal interface material is in direct contact with the thermal exchange plate, wherein the separator sheet is sandwiched between the thermal interface material and the battery array.

3. The traction battery assembly of claim 1, wherein the separator sheet is vertically below the battery array, wherein the separator sheet is vertically above the thermal interface material and the thermal exchange plate.

4. The traction battery assembly of claim 1, wherein a first side of the thermal interface material is adhered to the separator sheet and an opposite, second side of the thermal interface material is adhered to the thermal exchange plate.

5. The traction battery assembly of claim 1, wherein the thermal interface material is in direct contact with the battery array, wherein the separator sheet is sandwiched between the thermal interface material and the thermal exchange plate.

6. The traction battery assembly of claim 1, wherein the separator sheet is vertically below the battery array and the thermal interface material, wherein the separator sheet is vertically above the thermal exchange plate.

7. The traction battery assembly of claim 1, wherein a first side of the thermal interface material is adhered to the battery array and an opposite, second side of the thermal interface material is adhered to the separator sheet.

8. The traction battery assembly of claim 1, wherein the separator sheet is a polymer-based film.

9. The traction battery assembly of claim 1, wherein separator sheet is a polyethylene terephthalate sheet.

10. The traction battery assembly of claim 1, wherein the thermal interface material is a liquid thermal interface material.

11. The traction battery assembly of claim 1, wherein the thermal interface material is a thermal interface material pad.

12. The traction battery assembly of claim 1, wherein the separator sheet is a first separator sheet that is sandwiched between the battery array and the thermal interface material, and further comprising a second separator sheet that is sandwiched between the thermal interface material and the thermal exchange plate.

13. The traction battery assembly of claim 1, wherein the separator sheet is configured to prevent the thermal interface material from bonding directly to the battery array or the thermal exchange plate.

14. The traction battery assembly of claim 1, wherein the battery array is movable relative away from the thermal exchange plate and the thermal interface material while the thermal interface material remains bonded to the thermal exchange plate.

15. The traction battery assembly of claim 1, wherein the battery array and the thermal interface material are movable together relatively away from the thermal exchange plate while the thermal interface material remains bonded to the battery array.

16. A traction battery assembly, comprising:
   a thermal exchange plate;
   a battery array;
   a separator sheet between the thermal exchange plate and the battery array; and
   a thermal interface material between the thermal exchange plate and the battery array, the thermal interface material bonding one of the thermal exchange plate or the battery array to the separator sheet, the other of the thermal exchange plate or the battery array movable relative to the separator sheet.

17. The traction battery assembly of claim 16, wherein the battery array, the thermal interface material, and the separator sheet are bonded together and are movable together relative to the thermal exchange plate.

18. The traction battery assembly of claim 2, wherein the thermal exchange plate, the thermal interface material, and the separator sheet are bonded together and movable together relative to the battery array.

19. The traction battery assembly of claim 16, wherein, about an entire circumferential perimeter of the thermal interface material, a peripheral area of the separator sheet extends past a periphery of the thermal interface material.

* * * * *